United States Patent
Ganopoulos et al.

(10) Patent No.: US 7,554,093 B1
(45) Date of Patent: Jun. 30, 2009

(54) UNIFORMLY RESPONSIVE ULTRAVIOLET SENSORS

(75) Inventors: Mike Ganopoulos, Danbury, CT (US); William C. Fricke, New Fairfield, CT (US)

(73) Assignee: Star Tech Instruments, Inc., New Fairfield, CT (US)

( * ) Notice: Subject to any disclaimer, the term of this patent is extended or adjusted under 35 U.S.C. 154(b) by 5 days.

(21) Appl. No.: 12/008,587

(22) Filed: Jan. 11, 2008

(51) Int. Cl.
*G01J 1/42* (2006.01)
(52) U.S. Cl. ...................................... 250/372
(58) Field of Classification Search ............. 250/372
See application file for complete search history.

(56) References Cited

U.S. PATENT DOCUMENTS

| | | | |
|---|---|---|---|
| 3,745,359 A | 7/1973 | Martone | 250/369 |
| 3,960,756 A | 6/1976 | Noakes | 252/301.18 |
| 4,037,105 A | 7/1977 | Laurer | 250/367 |
| 4,090,081 A | 5/1978 | Takami et al. | 250/368 |
| 4,272,679 A * | 6/1981 | Blades | 250/372 |
| 4,511,799 A | 4/1985 | Bjorkholm | 250/367 |
| 4,656,359 A | 4/1987 | Persyk et al. | 250/486.1 |
| 4,885,471 A | 12/1989 | Telfair et al. | 250/461.1 |
| 5,355,309 A | 10/1994 | Eberhard et al. | 364/413.15 |
| 5,399,869 A | 3/1995 | Usuda | 250/486.1 |
| 5,508,524 A | 4/1996 | Goldberg et al. | 250/369 |
| 5,703,366 A | 12/1997 | Sting et al. | 250/341.2 |
| 6,087,663 A | 7/2000 | Moisan et al. | 250/367 |
| 6,297,506 B1 | 10/2001 | Young et al. | 250/369 |
| 6,335,529 B1 * | 1/2002 | Sekii et al. | 250/372 |
| 6,369,390 B1 | 4/2002 | Genna | 250/368 |
| 6,448,559 B1 | 9/2002 | Saoudi et al. | 250/367 |
| 6,521,894 B1 | 2/2003 | Iwanczyk et al. | 250/370.11 |
| 7,006,284 B2 | 2/2006 | Fricke | 359/355 |
| 7,091,490 B2 | 8/2006 | Sumlya et al. | 250/367 |

FOREIGN PATENT DOCUMENTS

| | | | |
|---|---|---|---|
| JP | 63082326 A | * | 4/1988 |
| JP | 2000213983 A | * | 8/2000 |
| JP | 2000258247 A | * | 9/2000 |

OTHER PUBLICATIONS

Fricke, et al "Downconversion offers UV sensing option" Laser Focus World, Jan. 2000, pp. 199, 200 & 201.

* cited by examiner

*Primary Examiner*—David P Porta
*Assistant Examiner*—Marcus H Taningco
(74) *Attorney, Agent, or Firm*—Ware, Fressola, Van Der Sluys & Adolphson LLP

(57) ABSTRACT

The fluorescent response of a UV radiometer to a UV beam is normalized over an entrance aperture area by using a plurality, preferably two, converting plates. The fluorescent response of at least two and preferably a plurality of crystal converting plates is ascertained. Crystal converting plates having complementary responses are selected and placed adjacently in the entrance aperture area such that an incident UV beam will cause a net complementary fluorescent response from the combined first and second crystal converting plates that is less varying over the entrance aperture area than the respective fluorescent responses of the individual first and second crystal converting plates.

19 Claims, 5 Drawing Sheets

UNIFORMLY RESPONSIVE ULTRAVIOLET SENSORS

FIELD OF THE INVENTION

The invention herein relates to measurement of the intensity of an incident beam of ultraviolet (UV) radiation, such as a laser beam, and more particularly to compensating for non-uniformity of ultraviolet radiation-to-fluorescence crystal converting plates used in such measurement.

BACKGROUND OF THE INVENTION

Ultraviolet (UV) radiometers have been developed to measure the power of beams of UV radiation. Such UV beams are typically produced by lasers, and the power of UV laser beams is measured so that calibration of the laser is assured and adjusted if required. If the power of a laser is not accurately measured, the laser may not perform as desired in delicate or precision uses.

In a UV radiometer shown and described in U.S. Pat. No. 4,885,471, the disclosure of which is incorporated herein by reference, a beam of UV radiation is incident on a plate of material that converts the UV radiation to visible fluorescent radiation in response to and in proportion to the power of the beam of UV radiation. Various methods and apparatus are shown for collecting and measuring the fluorescent radiation produced in the plate, to indirectly measure the power of the incident beam of UV radiation. The basic technique is to position photodiodes or other photocells for receiving the fluorescent radiation produced in the converting plate, and using the photocell to produce an electrical signal proportionate to the amount of fluorescent radiation that has been collected by the photocell or photocells.

The converting plate is generally a crystal containing fluorescent media, often referred to as "impurities" because they are undesirable for most uses of the crystals. However, even though they are called "impurities", they are both intended and necessary to the measurement of the power of a beam of UV radiation by the aforementioned fluorescing technique. One such material is an undoped oxide crystal and rare earth doped crystals will also suffice. Another material is a rare earth doped garnet, such as $Ce^{3+}:Y_3AL_5O_{12}$(YAG). Besides cerium (Ce), other rare earth elements suitable for doping include neodymium (Nd), lanthanum (La) and Europium (Eu), as well as others.

The crystals are grown as a boule, and the methods of growing crystals is such that the concentration of the fluorescent impurities generally varies along the direction of growth. Crystal converting plates are made by first cutting a cylindrical core of the boule, taken across the growth direction. Circular converting plates are then sliced from the cylindrical core, so that the converting plates will typically have impurity concentration gradients generally along the growth direction of the boule, which is across the diameter of the converting plate, and when used for measurement of the strength of a beam of UV radiation, converting plates cut from these crystals will have response variations generally across the growth direction and, to a lesser extent, along other directions taken across the crystal plate. It should be noted that the response gradients are not always or exactly aligned in the growth direction, depending on the conditions of the crystal growth and other variables. These response variations can be as large as 20% across the diameter of a crystal converting plate, and this has proven unacceptable for measuring the power of an incident UV beam because the measurement becomes dependent on where the UV beam is incident on the converting plate.

Although the response variations can be minimized by cutting the crystal converting plates perpendicularly to the growth direction of the boule, this does not always eliminate the variations in response, and some UV detection applications require specific orientations that are difficult or perhaps impossible to grow along the desired axis.

The net result is that UV radiometers generally do not produce a uniform measurement when a beam of incident UV radiation is varied in its point of incidence on a crystal converting plate of a UV radiometer, wherein the measurement achieved by the UV radiometer is a function of both the strength of the beam and the non-uniform response of the crystal converting plate. This is, of course, not desirable and improvement would be a valuable advance in the art.

SUMMARY OF THE INVENTION

It is a principal object of the invention herein to provide an improved UV radiometer.

It is an additional object of the invention herein to provide a UV radiometer which has more uniform response over a beam incident area.

It is a further object of the invention herein to provide an improved UV radiometer adapted for accurate measurement of the power of incident beams of UV radiation.

It is another object of the invention herein to provide a method normalizing the response of UV radiometers.

In carrying out the invention herein, an ultraviolet (UV) radiometer is provided including crystal converting plates for converting a beam of incident UV radiation to fluorescence, the UV radiation converting means being a plurality of at least two converting plates including fluorescing material. Each crystal converting plate has a varying fluorescent response over a beam incident area and the plurality of converting plates are selected and oriented to provide a net complementary fluorescent response normalized over the beam incident area in an entrance aperture of the UV radiometer. The number of selected converting plates positioned in a UV radiometer is preferably two. Means are also provided for detecting the fluorescent radiation and producing a signal corresponding to the power of the detected fluorescent radiation, the signal indicating the power or energy of the incident beam of UV radiation.

In other aspects, the converting plates are crystal converting plates having a distribution of fluorescent impurities. The converting plates may be any crystal having fluorescing impurities and the crystals may be selected doped as necessary to enhance response to various wavelengths of an incident beam of ultraviolet radiation. The fluorescent response of individual converting plates is ascertained and converting plates are selected and positioned in a UV radiometer such that the combined response of the selected and positioned converting plates is more uniform than is typically achieved by a single converting plate. The fluorescent response of individual crystal converting plates is ascertained across a diameter of the converting plates in an X-direction. The X-direction may be the direction of crystal growth or may be the direction a greatest variation of fluorescent response. When the fluorescing impurities of two converting plates exhibit relative output signal gradients along a given X-direction, one of the converting plates may be reversed with respect to the other, such that the X-directions of the two crystal converting plates provide a normalized net complementary fluorescent response.

Also according to the invention, the fluorescent response of crystal converting plates may be ascertained in a Y-direction perpendicular to the X-direction, and the fluorescent response along the Y-direction is also considered in selecting and combining complementary crystal plates to achieve a normalized net complementary fluorescent response.

In additional aspects, the plurality and preferably two converting plates are mounted in juxtaposed relationship, and photodiodes are positioned adjacent one of the crystal plates to detect the level of fluorescence in both converting plates created by an incident beam.

The invention is carried out by the method of ascertaining the fluorescent response of a plurality of crystal converting plates, and by selecting and positioning two or more crystal converting plates in a beam incident area to normalize the fluorescent response of the combined plates.

The foregoing and other objects and features of the invention herein will impart be apparent to those skilled in the art and will impart appear in the following detailed description and claims, taken together with the drawings.

BRIEF DESCRIPTION OF DRAWINGS

The same reference numerals refer to the same elements throughout the various figures.

DETAILED DESCRIPTION OF THE INVENTION

Figure 1:
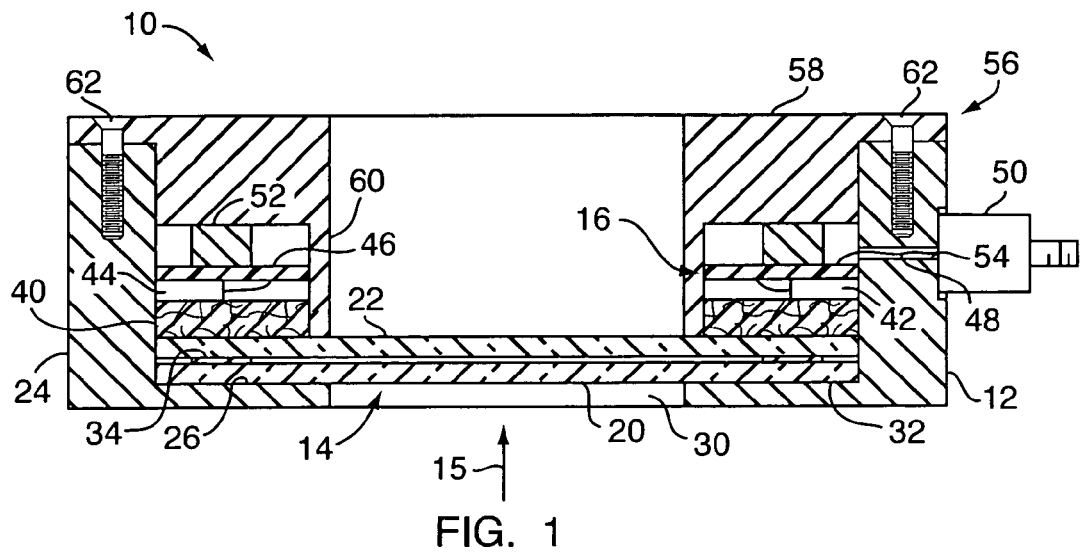
FIG. 1 is a sectional view of a UV radiometer according to the invention herein.

A UV radiometer 10 according to the invention herein is illustrated in FIGS. 1-4, and generally comprises a housing 12, a plurality of UV radiation-to-fluorescent emission converting plates 14, and a fluorescent light sensor 16 producing a signal indicative of fluorescent radiation present in the converting plates 14. The UV radiometer 10 is characterized by two circular crystal converting plates 20, 22 selected and oriented to provide a fluorescent response and resultant output signal that is normalized over the incident area of a beam 15 of UV radiation.

The housing 12 includes a cylindrical outer wall 24 and an annular flange 26 extending radially inwardly therefrom, to define an entrance aperture 30. The first converting plate 20 has its outer annular peripheral edge 32 received on the annular flange 26 of housing 12. The second converting plate 22 is placed adjacent the first converting plate 20, and the converting plates are separated by a spacer ring 34. An annular optical filter 40 is positioned adjacent the second converting plate 22, within the annular flange 26.

The central portions of the first and second converting plates are exposed in the entrance aperture 30.

Figure 3:
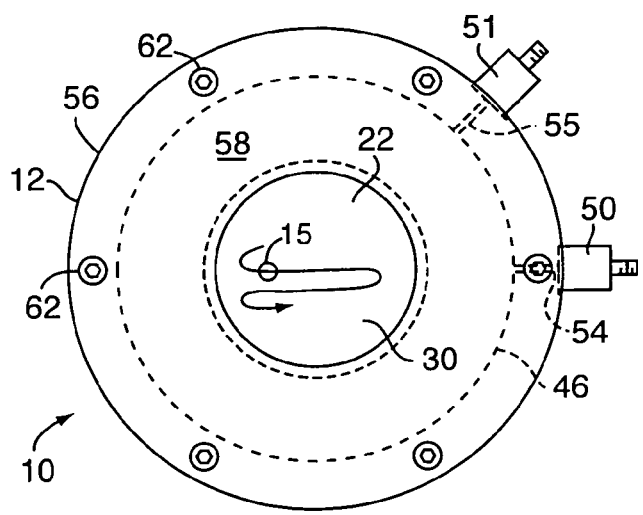
FIG. 3 is an end view of the UV radiometer of FIG. 1, showing an incident UV beam.
Figure 2:
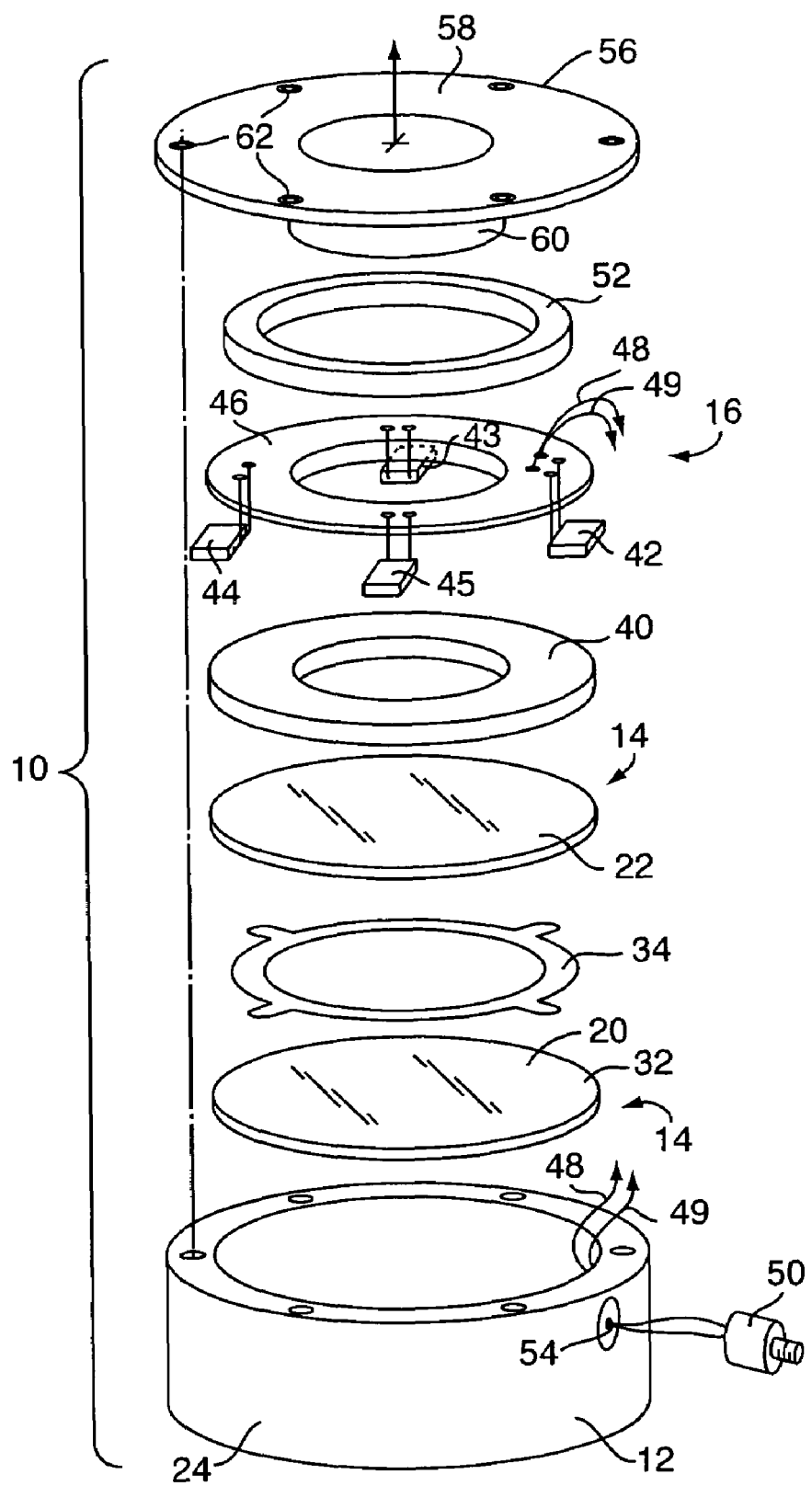
FIG. 2 is an exploded perspective view of the UV radiometer of FIG. 1.

The fluorescent light sensor 16 includes four photodiodes 42-45 deployed evenly spaced apart around the converting plate 22, adjacent to the optical filter 40. The optical filter 40 blocks stray radiation, e.g. ambient light, from becoming an input to the photodiodes. The photodiodes 42-45 are mounted on an annular circuit board 46 and leads 48, 49 from the respective photodiodes 42-45 extend through the housing wall 24 to output signal connectors 50 and 51. The positive output leads 48 are collected at signal connector 50 and the negative output leads 49 are collected at signal connector 51. This is facilitated by an annular spacer 52 positioned adjacent to circuit board 46, and openings 54, 55 in the outer wall 24 through which the leads 48 are accommodated and in which the signal connectors 50, 51 are mounted, as best seen in FIG. 3.

The housing 12 is provided with a cover 56, which includes an annular top 58 and a cylindrical inner wall 60. The cover 56 is secured to the outer wall of the housing 12 by screws 62 and as shown in FIG. 1, the inner wall 60 extends to the second plate 22 and thereby encloses the optical filter 40, the photodiodes 42-45 and circuit board 46, and spacer 52.

The output signal connectors 50, 51 are preferably secured to the housing wall 24, and present plug connectors for connection to further processing circuitry and an output display, not shown but well known in the art. The strength of the signal from the photodiodes 42-45 is a function of the fluorescence created in the converting plates 20, 22 by an incident laser beam 15 and thus provide a measurement of the strength of the laser beam 15.

The photodiodes 42-45 are evenly spaced apart about the circuit board 46 and are therefore also evenly spaced about the annular peripheral edges of the first and second converting plates 20, 22. With reference to FIG. 3, the housing 12 and cover 56 define the entrance aperture 30. The entrance aperture 30 has a diameter of 35 mm in the UV radiometer 10 illustrated herein. FIG. 3 also shows the incident UV beam 15, typically having a diameter on the order of 5 mm, incident on the central areas of the first and second converting plates 20, 22 exposed in the entrance of aperture 30.

The crystal converting plates 20,22 of UV radiometer 10 are about 2.375" (60.3 mm) in diameter and about 0.060" (1.5 mm) thick. The outer edges of the crystal converting plates 20, 22 are ground to a matte finish. The converting plates are undoped sapphire crystal, chosen to work with the wavelength of incident beam 15. Different crystal, doped or undoped, may be chosen for use with incident UV beams having different wavelengths. The spacer ring 34 is about 0.002" (0.5 mm.) thick and is transparent to fluorescent radiation 68. That fluorescence 68 from converting plate 20 may be sensed by the photodiodes 42-45.

Figure 4:
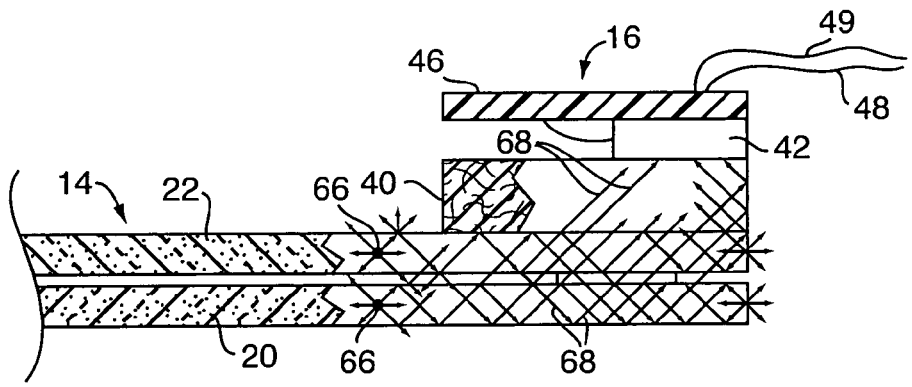
FIG. 4 is a schematic illustration of first and second UV radiation-to-fluorescent emission crystal converting plates of the UV radiometer of FIG. 1.

The sapphire crystal converting plates 20 and 22 have fluorescent impurities. With reference to FIG. 4, the fluorescing impurities are schematically shown at 66 and are distributed throughout the converting plates 20, 22. The UV beam 15 from a laser, the power of which is to be measured by the UV radiometer 10, is incident on the converting plates 20 and 22. This causes fluorescence 68 of the impurities 66, and the fluorescence 68 propagates in all directions from the impurities 66. Substantially total internal reflection traps the fluorescence 68 inside the converting plates 20, 22 and the fluorescence travels to the outer annular peripheries of the converting plates where it is sensed by the photodiodes 42-45. The matte finish outer edges of the first and second converting plates 20 and 22 scatter fluorescence 68 in all directions and in particular toward the photodiodes 42-45. The converting plates 20, 22 are substantially transparent to the incident UV beam 15, so that the beam 15 will excite fluorescent impurities 66 in both of the converting plates 20,22.

The impurities 66 typically occur as a result of the growth process. As also discussed above, the impurities in the boule tend to vary generally linearly along the direction of crystal growth. The crystal plates 20, 22 are preferably slices of a cylindrical core cut from a boule, the core being taken transverse to the direction of growth. Thus, when the core is sliced into crystal plates, such as converting plates 20, 22, the distribution of impurities typically varies across a diameter of the plate in the direction of crystal growth. However, the linear variation of impurities is not precisely or even necessarily greatest along the direction of crystal growth. The impurities also typically vary across a crystal plate along a diameter perpendicular to the direction of growth of the crystal, although lesser variation is normally expected. It should also be noted that the population of fluorescent impurities in the crystal converting plates 20, 22 is generally quite low, ie, the fluorescent impurities are not a desired feature of crystal growth. Because of the low density of the population of impurities, the distribution of the impurities is also somewhat less linear and predictable.

Figure 5:
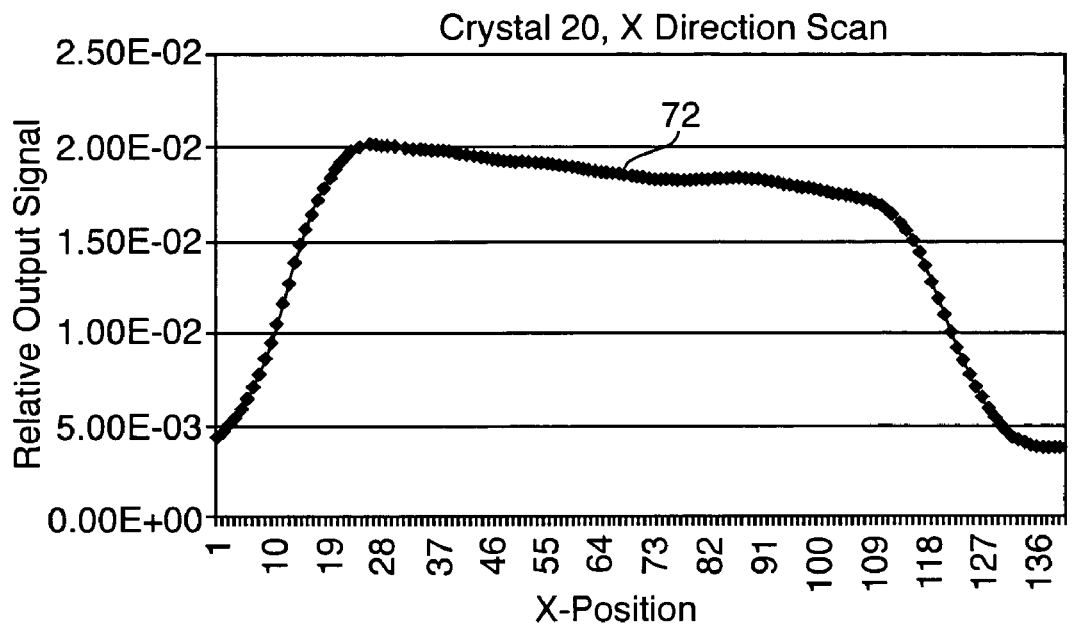
FIG. 5 is a graph of the relative output signal of an X-direction scan of the first crystal converting plate of the UV radiometer of FIG. 1.

This is illustrated in FIG. 5, which is an X-direction scan of the first crystal converting plate 20. The X-direction scan is performed by traversing a laser beam across the crystal converting plate 20 generally in the direction of growth, although the direction is preferably determined empirically, as more fully discussed below.

The horizontal X-Position axis of the graph of FIG. 5 shows the sequential positions or progress of a standardized scanning beam across a diameter of the converting plate 20, and the vertical axis of the graph of FIG. 5 shows a relative output signal 72 at each of the positions of the standardized scanning beam. It should be noted that the peripheral marginal edges of the plate 20 are blocked by the flange 26 when the converting plate is installed in the radiometer 10 and are not used for measuring the strength of an incident beam. Therefore, the relative output signal from the edges is not considered for purposes of FIG. 5.

The graph of FIG. 5 shows that the relative output signal 72 of the crystal converting plate 20 in response to the scanning beam decreases in a substantially linear fashion from the peak at approximately X-position 25 to a lower value at X-position 110. This is consistent with a linearly decreasing population of fluorescent impurities in the general direction of crystal growth.

As discussed above, the impurities tend to vary linearly along the direction of crystal growth, but this is a general tendency and is not always correct. For purposes of selecting a particular crystal converting plate 20 from a plurality of converting plates for use in radiometer 10, it is desirable to locate the direction across the converting plate in which there is the greatest variation in the density of impurities, i.e. the scanning direction that produces the greatest slope or variation of the output signal 72. To this end, the crystal converting plate 20 is preferably scanned many times, being rotated between scans, until the scanning direction across the crystal converting plate that produces the largest signal gradient is identified. That identified direction is denominated the "X-Direction" in preparing the graph of FIG. 5.

Figure 6:
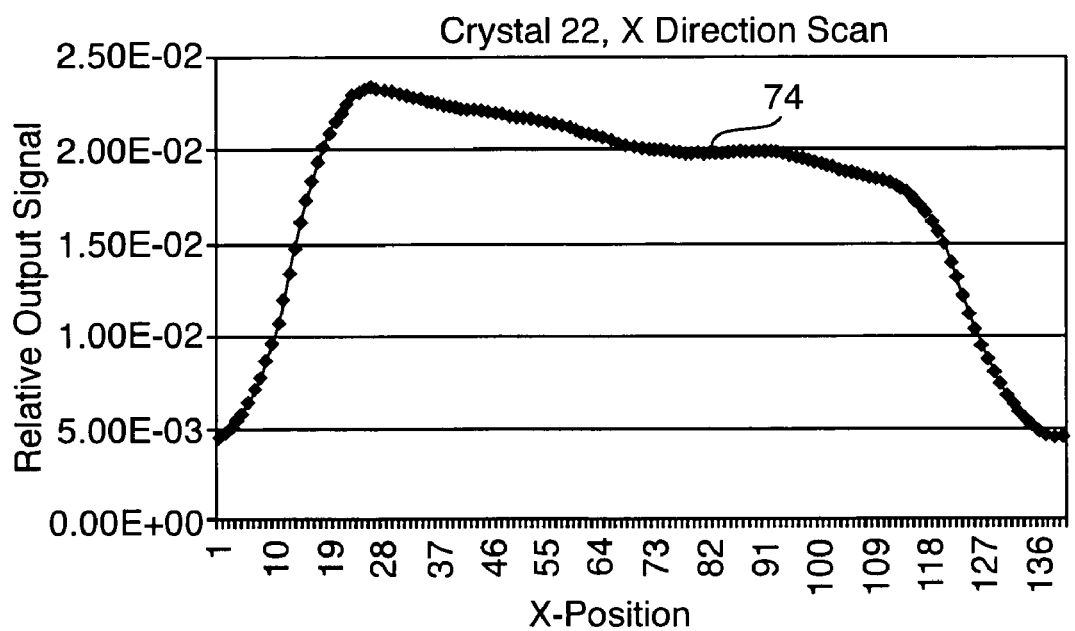
FIG. 6 is a graph of the relative output signal of an X-direction scan of the second crystal converting plate of the UV radiometer of FIG. 1.

FIG. 6 is a similar scan with a standardized beam of the second crystal converting plate 22, also in the X-direction as defined above. The crystal 22 also exhibits a decreasing fluorescent response and relative output signal 74 from about X-position 25 to about X-position 110, the edges being of no interest. The relative output signal 74 for crystal converting plate 22 is greater than that of crystal converting plate 20, reflecting a higher density of impurities; however, the two scans of FIGS. 5 and 6 are similar in showing a generally linear decrease in output signal as a function of the X-position of the standardized scanning beam across the converting plates in the X-direction.

Figure 7:
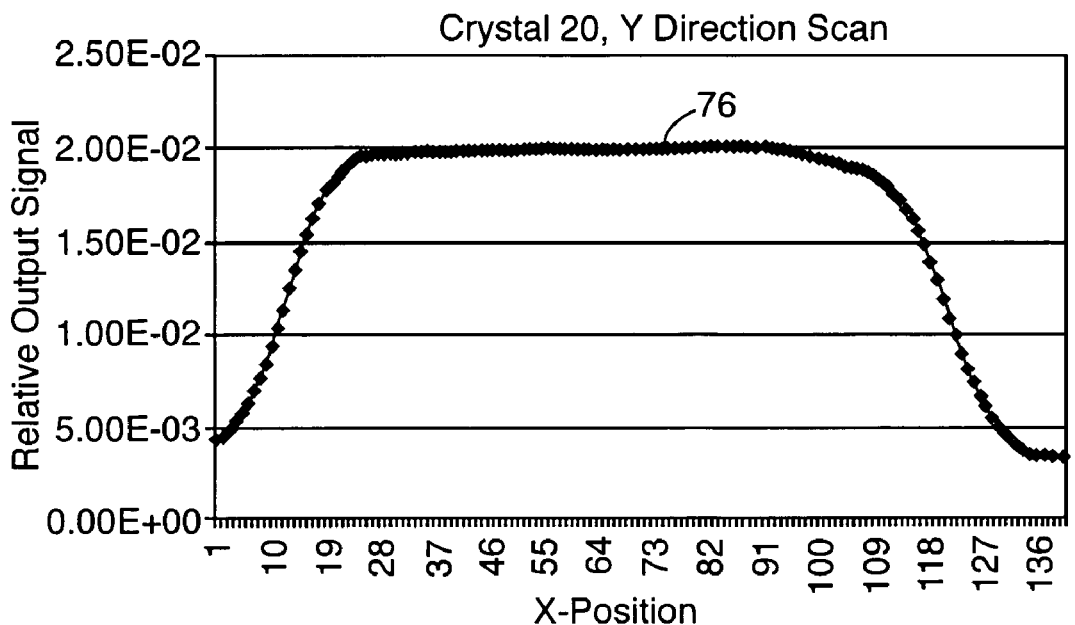
FIG. 7 is a graph of the relative output signal of a Y-direction scan of the first crystal converting plate of the UV radiometer of FIG. 1.
Figure 8:
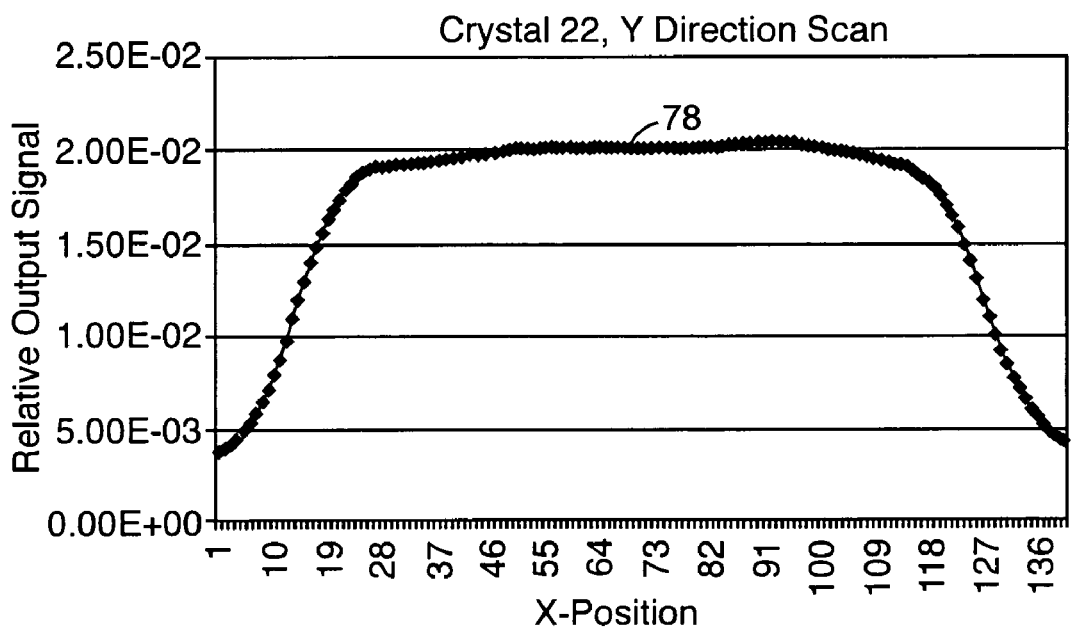
FIG. 8 is a graph of the relative output signal of a Y-direction scan of the second crystal converting plate of the UV radiometer of FIG. 1.

FIGS. 7 and 8 show the relative output signals 76 and 78, respectively for similar scans of crystal converting plates 20, 22, respectively, in the Y-direction. The Y-direction is perpendicular to the X-direction of scans of FIGS. 5 and 6, and is generally perpendicular to the direction of crystal growth where less variation in impurity density would be expected. The graphs of FIGS. 6 and 7 show that the relative output signals 76, 78 are more uniform for scans taken across the converting plates in the Y-direction, although some nonlinearity is apparent.

It is desired to normalize the response of radiometer 10 over the incident area of beam 15, and this is accomplished by using the two converting plates 20 and 22 in a complementary manner. This is achieved by positioning one of the converting plates with respect to the other such that the increasing relative output signal of one of the converting plates is offset by the decreasing relative output signal of the other converting plate. This is usually accomplished by rotating one of the converting plates 180°, keeping the X-directions of the two converting plates aligned.

Figure 9:
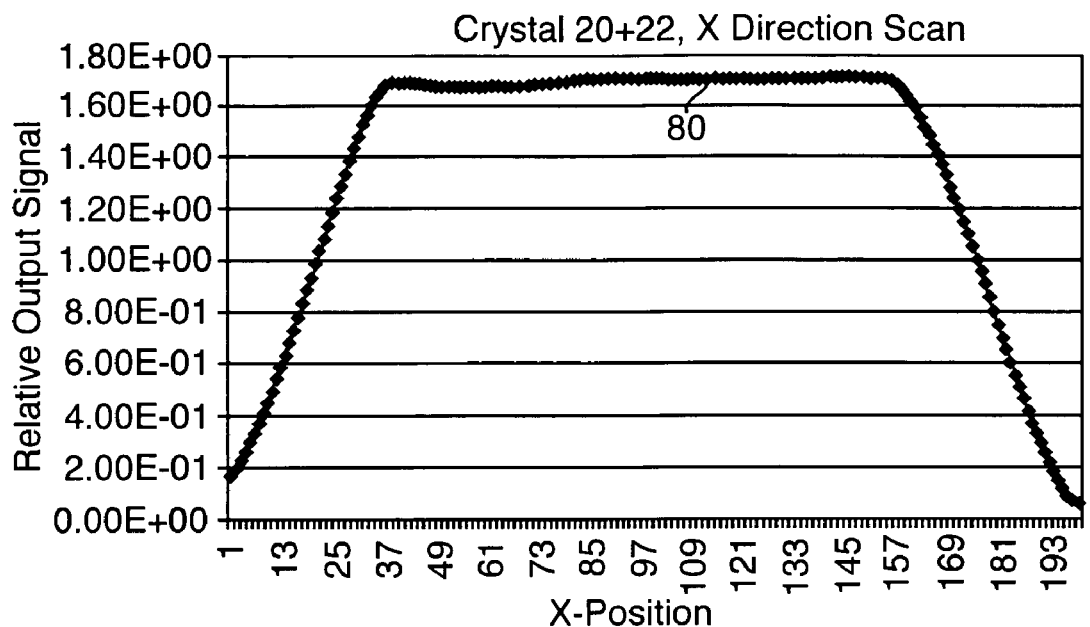
FIG. 9 is a graph of the net complementary relative output signal of an X-direction scan of the combined first and second crystal converting plates of the UV radiometer of FIG. 1.

FIG. 9 is a graph showing that the relative output signal 80 in the X-direction, as defined above, of the combined crystal converting plates 20, 22, with the X-direction of converting plate 20 reversed with respect to the X-direction of converting plate 22. In other words, the plates are positioned if their directions of growth or maximum variation in fluorescent response are opposed, and the relative output signal 80 in the graph of FIG. 9 is the sum of the relative output signals 72-74 of crystal converting plates 20, 22. As well illustrated by the graph of FIG. 9, this produces a net complementary relative output signal 80 from the combined crystal converting plates 20, 22 that is substantially linear.

Figure 10:
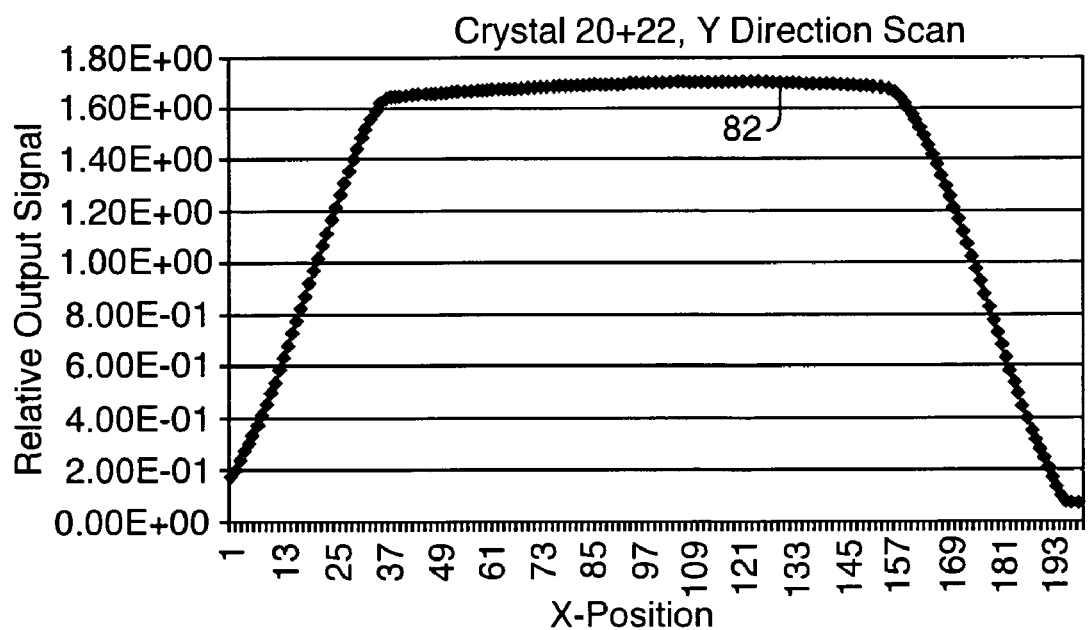
FIG. 10 is a graph of the net complementary relative output signal of a Y-direction scan of the combined first and second crystal converting plates of the UV radiometer of FIG. 1.

With reference to FIG. 10, the scan of the combined converting plates 20, 22 in the Y-direction also produces a complementary relative output signal 82 that is substantially linear across the diameters of the crystal converting plates. When the combined relative output signals of converting plates 20, 22 are substantially linear in both the X-direction and Y-direction, the radiometer 10 produces a measurement of the strength of beam 15 that is substantially independent of the incident area of beam 15, i.e. the response may be considered normalized.

The crystal plates 20, 22 are selected from a supply of crystal converting plates, each of which is scanned to determine their respective variation in relative output signal across the diameters of the converting plates. Crystal plates 20, 22 are selected from the plurality of converting plates such that their complementary relative output signal will be substantially linear. The selection is performed by looking for converting plates with similar response gradients, so that the selected converting plates may be oriented to produce a linear response. Scans may be performed in the directions other than across the direction of crystal growth or maximum variation and the results of all of these scans may be used in selecting and positioning combinations of two or more crystal converting plates to produce a substantially linear relative output signal across the entire exposed area of the converting plates. When two or more crystal converting plates are selected and oriented to produce such a linear response, they are mounted in that orientation in the UV radiometer 10. It is preferred that the more responsive converting plate be mounted to receive the beam 15 initially. This is because fluorescence produced in the first converting plate is further from the photodiodes 42-45 and is also somewhat attenuated in passing through the second plate whereby it is desirable to mount the lesser responsive converting plate closer to the photodiodes.

With reference to FIG. 3, an incident beam 15 of a laser the power of which is to be measured is typically on the order of 5 mm in diameter, and the beam 15 is incident on the converting plates 20, 22 in the 35 mm entrance aperture 30 of the UV radiometer 10. It should also be noted that an incident beam 15 may not be directed to a single fixed position or area of the converting plates 20, 22 from measurement to measurement and that the incident beam 15 may be dithered by the laser producing it such that it is incident on varying areas of the converting plates 20, 22. Thus, the uniform response of the converting plates over the entire area is important in obtaining an accurate measurement of beam strength.

The linear signals 80, 82 of FIGS. 9 and 10, respectively, fully illustrate that the strength of beam 15 measured by the radiometer 10 is substantially uniform across the X-direction and the Y-direction. Therefore, the measurement of the power of the instant beam made by the UV radiometer 10 is not dependent on the position of the incident beam within the entrance aperture 30, and a precise and accurate measurement is obtained at any incident area of the beam.

Therefore, a UV radiometer 10 and a method of selecting and positioning converting plates in the UV radiometer have been described, resulting in the accurate measurement of beam strength without regard to the particular area of the converting plates on which the beam is incident. The description set forth above is illustrative of the invention herein. However, those skilled in the art will recognize that various changes and modifications may be made without departing from the spirit and scope of the invention, which is limited only by the following claims:

We claim:

1. A UV radiometer for measuring the power of an incident UV beam, comprising:
    A) a housing defining an entrance aperture for receiving a UV beam in a beam incident area; crystal converting plates mounted in the housing at the entrance aperture, such that the crystal converting plates are exposed in the beam incident area for converting UV radiation of an incident UV beam to fluorescence, the crystal converting plates comprising at least two crystal converting plates each having a varying fluorescent response over the UV beam incident area, the at least two crystal converting plates selected and oriented to provide a complementary net fluorescent response normalized over the beam incident area; and
    B) fluorescence sensing means for producing a signal from fluorescence in the crystal converting plates, said signal indicating the strength of the UV beam incident on the beam incident area.

2. A UV radiometer as defined in claim 1 wherein a varying fluorescent response for each crystal converting plate is ascertained in an X-direction across respective the crystal converting plate, and the at least two crystal converting plates are oriented with the respective X-directions of the respective crystal converting plates aligned.

3. A UV radiometer as defined in claim 2 wherein the X-direction is the direction of crystal growth of the crystal converting plates.

4. A UV radiometer as defined in claim 2 wherein the X-direction is a direction across the crystal converting plates having the greatest fluorescent response variation.

5. A UV radiometer as defined in claim 2 wherein a varying fluorescent response for each crystal converting plate is also ascertained in a Y-direction generally perpendicular to the X-direction, and the at least two crystal converting plates are selected and oriented to provide a complementary net fluorescent response based on the X-direction fluorescent responses and the Y-direction fluorescent responses of the converting plates.

6. A UV radiometer as defined in claim 5 wherein the X-direction is the direction of crystal growth of the crystal converting plates.

7. A UV radiometer as defined in claim 5 wherein the X-direction is a direction across the crystal converting plates having the greatest fluorescent response variation.

8. A UV radiometer as defined in claim 1 wherein the first and second crystal converting plates are mounted adjacent each other and separated by a spacer.

9. A UV radiometer as defined in claim 1 wherein the crystal converting plates are undoped oxide crystals.

10. A UV radiometer as defined in claim 1 wherein the fluorescence sensing means comprises a plurality of photodiodes deployed evenly spaced apart about the peripheral edge of one of the first and second converting plates, the photodiodes positioned to sense the fluorescence in both of the first and second crystal converting plates.

11. A UV radiometer as defined in claim 10 and further comprising an optical filter deployed to block non-fluorescent radiation from the photodiodes.

12. A method of normalizing fluorescent response to a UV beam over an entrance aperture area of a UV radiometer, the method comprising:
    A) ascertaining the fluorescent response to a standardized UV beam of a first crystal converting plate over at least a portion of the first crystal converting plate to be exposed in the entrance aperture area of a UV radiometer;
    B) ascertaining fluorescent response to a standardized UV beam of a second crystal converting plate over at least a portion of the second crystal converting plate to be exposed in the entrance aperture area;
    C) placing the first and second crystal converting plates adjacently in the entrance aperture area such that an incident UV beam will cause a net fluorescent response from the first and second crystal converting plates; and
    D) orienting said first and second crystal converting plates to provide a net complementary fluorescent response to an incident UV beam that is less varying over the entrance aperture area than the respective fluorescent responses of the individual first and second crystal converting plates.

13. A method of normalizing fluorescent response as defined in claim 12, and further comprising:
    E) ascertaining the respective fluorescent responses to a standardized UV beam of more than two crystal converting plates over at least a portion of the plurality of crystal converting plates to be exposed in an entrance aperture area of a UV radiometer;
    F) selecting the first and second crystal converting plates from the plurality of plates to minimize variation in the net complementary fluorescent response of the first and second crystal converting plates to an incident beam over the entrance aperture area.

14. The method of normalizing fluorescent response to a UV beam as defined in claim 13 wherein the fluorescent responses of the plurality of crystal converting plates are ascertained in an X-direction across the crystal converting plates.

15. A method of normalizing a fluorescent response to a UV beam as defined in claim 14 wherein the X-direction is generally along the direction of crystal growth of the crystal converting plates.

16. A method of normalizing fluorescent response to a UV beam as defined in claim 15 and further comprising:
   G) ascertaining the respective fluorescent responses of the plurality of crystal converting plates in a Y-direction across the crystal converting plates, the Y-direction being generally perpendicular to the X-direction.

17. A method of normalizing a fluorescent response to a UV beam as defined in claim 14 wherein the X-direction is generally along the direction of having the greatest variation in fluorescent responses.

18. A method of normalizing fluorescent response to a UV beam as defined in claim 17 and further comprising:
   G) ascertaining the respective fluorescent responses of the plurality of crystal converting plates in a Y-direction across the crystal converting plates, the Y-direction being generally perpendicular to the X-direction.

19. A method of normalizing fluorescent response to a UV beam as defined in claim 14 and further comprising:
   G) ascertaining the respective fluorescent responses of the plurality of crystal converting plates in a Y-direction across the crystal converting plates, the Y-direction being generally perpendicular to the X-direction.

* * * * *